(No Model.)
J. D. MARLEY.
PLOW.
No. 441,313.  Patented Nov. 25, 1890.
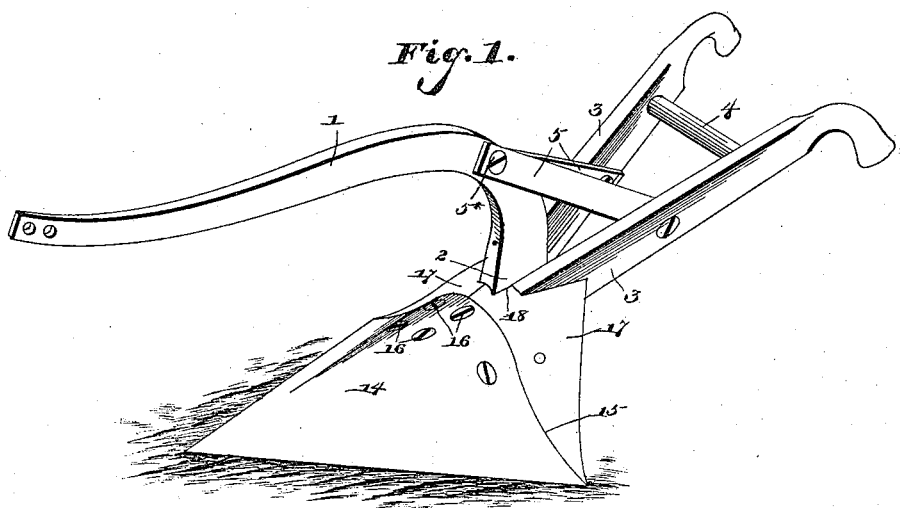
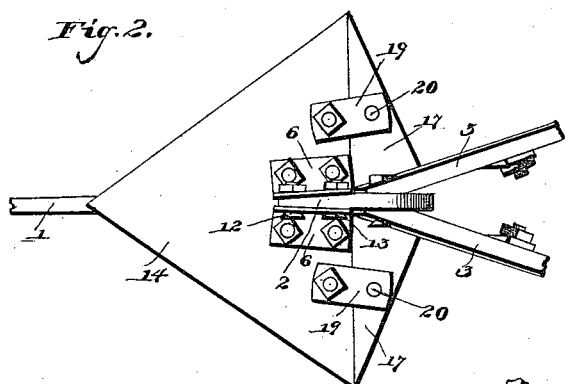
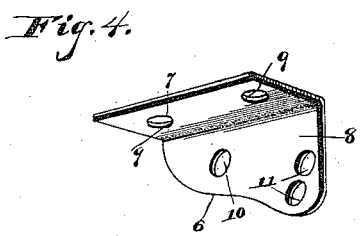
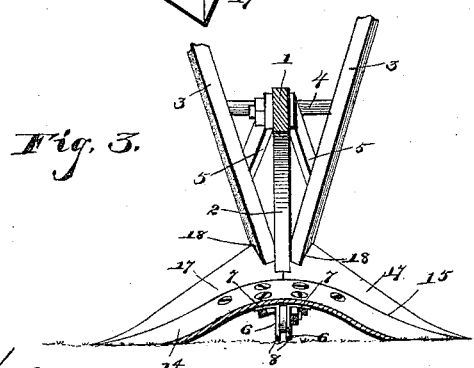
Witnesses:
Samuel Ker
W. S. Duvall
Inventor
James D. Marley
By his Attorneys,
C. A. Snow & Co.

UNITED STATES PATENT OFFICE.

JAMES D. MARLEY, OF DODD, TEXAS, ASSIGNOR OF ONE-HALF TO ISAAC M. CARTER, OF SAME PLACE.

PLOW.

SPECIFICATION forming part of Letters Patent No. 441,313, dated November 25, 1890.

Application filed July 19, 1890. Serial No. 359,331. (No model.)

*To all whom it may concern:*

Be it known that I, JAMES D. MARLEY, a citizen of the United States, residing at Dodd, in the county of Fannin and State of Texas, have invented a new and useful Plow, of which the following is a specification.

This invention has relation to improvements in sweep-plows.

The objects of the invention are to provide a plow of the above class which by its peculiar construction is extremely light in draft, may be run deep or shallow, and will plow or cut its entire width at all times and without turning the ground.

With the above objects in view the invention consists in certain features of construction hereinafter specified, and particularly pointed out in the claims.

Referring to the drawings, Figure 1 is a perspective of a plow constructed in accordance with my invention. Fig. 2 is a bottom plan view. Fig. 3 is a transverse section taken through the sweep and in front of the lower end of the plow-beam. Fig. 4 is a detail in perspective of one of the angle-brackets for adjusting the sweep.

Like numerals of reference indicate like parts in all the figures.

1 designates the plow-beam, which in the present instance is of the well-known gooseneck pattern, the lower portion of the beam terminating in a forwardly-disposed foot 2.

3 designates the usual handles, the lower ends of which are bolted to the beam a short distance above the foot, said handles diverging toward their free ends and connected by the usual rung 4.

5 designates a pair of braces bolted at their free ends, as at 5$^\times$, to the beam, and having their rear ends diverged and bolted to the handles, whereby said handles are securely braced and made rigid with the beams.

6 designates brackets, which in cross-section are L-shaped, each bracket consisting of a lateral and vertical portion 7 and 8, respectively. The lateral portions 7 of the bracket have bolt-openings 9, and the vertical portions at their front ends are provided with a single bolt-opening 10 and in rear of the same with a pair of bolt-openings 11. The bolt-openings 10 and 11 align with similar openings formed in the foot of the plow-beam, and through the bolt-openings 10 is passed a pivot-bolt 12, upon which the brackets may be raised and lowered at their free ends and maintained in either a raised or lowered position by means of an adjusting-bolt 13, passed through either of the bolt-openings 11.

14 designates the sweep, which is of triangular shape in plan, the central portion of the sweep being convexed, and said convexity gradually reduced toward the point thereof, and the opposite sides of the sweep being slightly concaved, as at 15, the opposite flaring sides or edges of the sweep being in the same plane as the point. The opposite converging edges of the sweep are sharpened, so as to cut readily into the soil. The sweep is connected to the plow-beam by means of bolts 16, passed through the sweep and through the openings 9 in the transverse portions of the angle-brackets.

17 designates triangular wings, there being one provided at each side of the standard, said wings having their inner edges notched, as at 18, to fit snugly around and overlap the sides and front ends and edges of the handles and beam, as shown, and the front edges of the wings are disposed at a right angle to the beam, and therefore conform to and match with the similarly-disposed rear edge of the sweep.

19 designates a pair of straps secured at their rear ends to the under side of the sweep and having their front ends forwardly disposed and bolted, as at 20, to the sweep near its rear edges.

The size of the wings may be varied to more or less disturb the soil, as may also the size of the sweep. It will be noticed that the sweep cuts the soil in a shear-like manner from point to heel and throughout the width of same, operating with the same facility and ease as an ordinary turning-plow, and yet preventing the turning of the soil upon the young crops at each side of the furrow. The ease of running is greatly facilitated by reason of the peculiar shape of the sweep, the same having a central convex portion and opposite concave portions in contradistinction to the usual form of sweep, which employs simply the convex shape.

Having described my invention, what I claim is—

1. The combination, with a plow-standard provided at opposite sides with adjustable brackets, of a triangular-shaped convexed sweep bolted to the brackets and having the angles of its base in the same plane with the apex or point and its rear edge disposed at a right angle to the beam, and opposite triangular wings partaking of the facial contour of the sweep and secured to the rear edge of the sweep and at opposite sides of the beam or standard, substantially as specified.

2. The combination, with the plow-standard terminating at its lower end in a foot provided with front and rear openings, of opposite right-angular brackets provided at their front ends with a single opening and at their rear ends with a pair of openings, a pivot-bolt passed through the front openings of the brackets and the foot, an adjusting-bolt passed through a pair of the rear openings of the bracket and of the foot, a triangular convexed sweep bolted to the upper portions of the brackets and having the base of the triangle in the same plane with the apex or point thereof, opposite wings of triangular shape located in rear and partaking of the facial contour of the sweep, and opposite straps bolted to the under side of the wings and sweep, substantially as specified.

In testimony that I claim the foregoing as my own I have hereto affixed my signature in presence of two witnesses.

JAMES D. MARLEY.

Witnesses:
T. J. VAN NOY,
J. R. FLETCHER.